(12) United States Patent
Elias et al.

(10) Patent No.: US 9,183,069 B2
(45) Date of Patent: Nov. 10, 2015

(54) MANAGING FAILURE OF APPLICATIONS IN A DISTRIBUTED ENVIRONMENT

(71) Applicants: Filip Elias, Vysni Lhoty (CZ); Filip Nguyen, Brno (CZ)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 240 days.

(21) Appl. No.: 13/803,374

(22) Filed: Mar. 14, 2013

(65) Prior Publication Data

US 2014/0281744 A1   Sep. 18, 2014

(51) Int. Cl.
| G06F 11/00 | (2006.01) |
| G06F 11/07 | (2006.01) |
| H04L 12/44 | (2006.01) |
| G06F 9/48  | (2006.01) |

(52) U.S. Cl.
CPC ........ *G06F 11/0709* (2013.01); *G06F 11/0715* (2013.01); *G06F 9/485* (2013.01); *G06F 11/0793* (2013.01); *H04L 12/44* (2013.01)

(58) Field of Classification Search
CPC ............ G06F 11/0709; G06F 11/0727; G06F 11/0793; H04L 12/44; H04L 12/462
USPC ...................... 714/4.1, 4.2, 4.21, 4.3; 370/256
See application file for complete search history.

(56) References Cited

U.S. PATENT DOCUMENTS

| 6,874,022 | B1 * | 3/2005 | Carew et al. ................. 709/224 |
| 7,062,683 | B2 | 6/2006 | Warpenburg et al. |
| 7,103,788 | B1 * | 9/2006 | Souza et al. .................. 713/323 |
| 7,117,273 | B1 * | 10/2006 | O'Toole et al. .............. 709/252 |
| 7,551,552 | B2 * | 6/2009 | Dunagan et al. ............. 370/221 |
| 8,010,504 | B2 | 8/2011 | Ashok et al. |
| 8,743,680 | B2 * | 6/2014 | Brown et al. ................. 370/218 |
| 2005/0007964 | A1 * | 1/2005 | Falco et al. .................. 370/256 |
| 2009/0177914 | A1 | 7/2009 | Winchell et al. |
| 2010/0177641 | A1 * | 7/2010 | Farkas et al. ................. 370/242 |
| 2012/0005724 | A1 | 1/2012 | Lee |
| 2012/0096142 | A1 | 4/2012 | Suit |
| 2012/0096316 | A1 | 4/2012 | Suit |

* cited by examiner

*Primary Examiner* — Alford Kindred
*Assistant Examiner* — Joseph Kudirka
(74) *Attorney, Agent, or Firm* — Lowenstein Sandler LLP

(57) ABSTRACT

A mechanism for managing failure of applications in a distributed environment is disclosed. A method includes detecting failure in an application node among a plurality of application nodes when the application node does not respond to a status message. The method further includes routing, by enterprise application nexus application processing interface (EANA) module, a first lock message to the failed application node and ancestors' nodes of the failed application node when the failed application node is an aware application node.

20 Claims, 5 Drawing Sheets

MANAGING FAILURE OF APPLICATIONS IN A DISTRIBUTED ENVIRONMENT

TECHNICAL FIELD

The embodiments of the disclosure relate generally to a computer system and, more specifically, relate to systems and methods for managing failure of applications in a distributed environment.

BACKGROUND

Typically in a distributed application environment, when an application fails to operate, the dependent layers of the application may also fail to operate. The dependent layers are one or more applications dependent on the application and on each other for execution. This causes inconsistencies in back-end storage, timeouts, erroneous responses for requests and even failure of other parts of the distributed application.

Currently many failure detection systems exist that detect failure in the distributed application system. One such known system is exception handling, which supports error detection by invoking exception when the application is in failure. An exception is an event that occurs during the execution of a program that disrupts the normal flow of instructions. The exception may be processed with handler which notifies other nodes in a distributed application. However, since the exception is application specific, it is not guaranteed that the exception may be invoked all the time. Also, when the failure occurs in hardware, exception may not be invoked and as such may not be detected by other nodes. Further, different applications use various timeouts, which complicates their unified usage.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
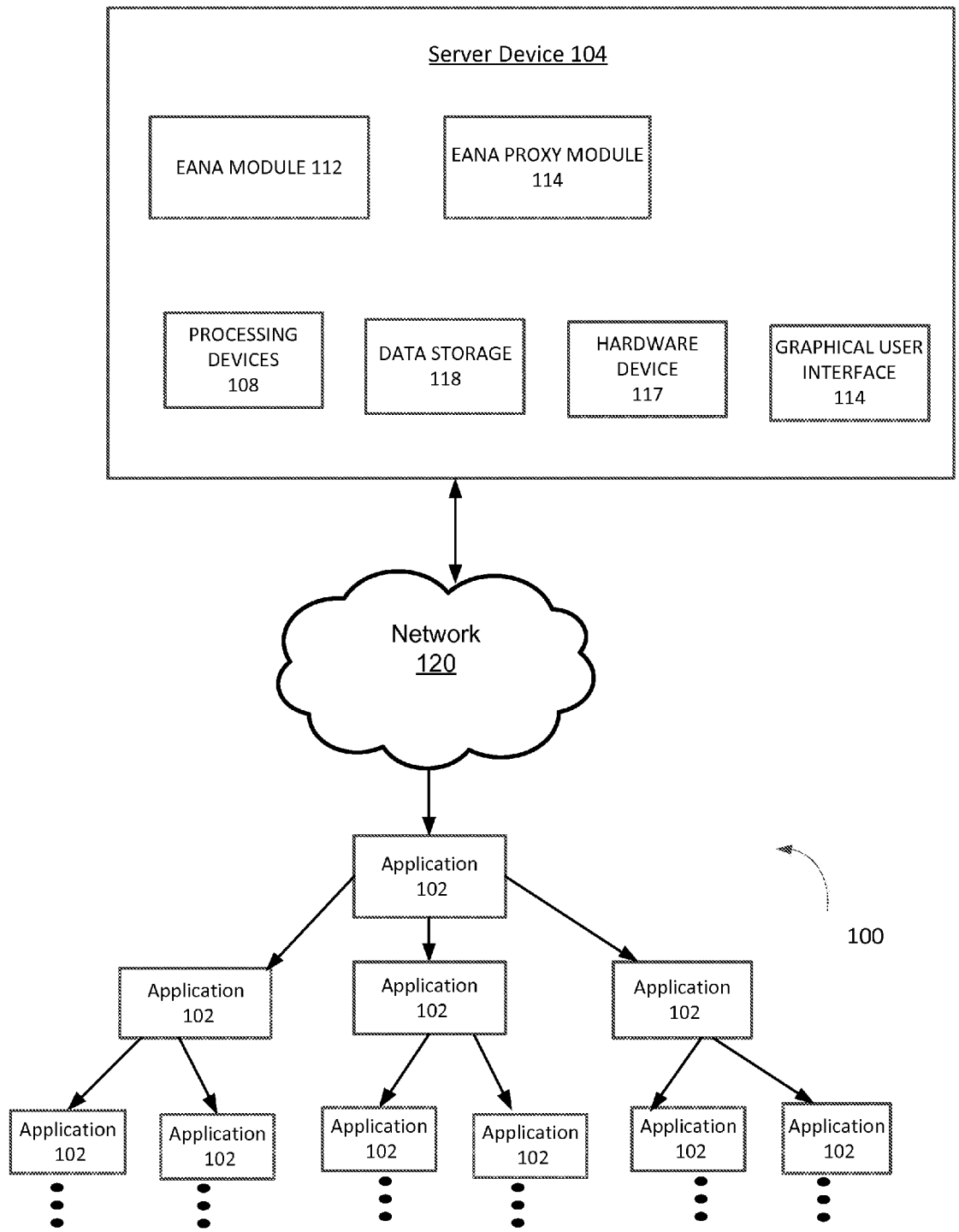
FIG. 1 is a block diagram of a distributed environment in which the embodiments of the present disclosure may operate.

Embodiments of the disclosure are directed to a method and system for managing failure of applications in a distributed environment in a computer system.

In one embodiment, a distributed environment includes a tree structure of applications. A tree structure may be defined recursively (locally) as a collection of nodes (starting at a root node), where each node is an application, together with a list of nodes (the "children"), with the constraints that no node is duplicated. Each node in the tree has zero or more child nodes, which are below it in the tree (by convention, trees are drawn growing downwards). A node that has a child is called the child's parent node (or ancestor node). The topmost node in a tree is called the root node. Being the topmost node, the root node does not have a parent. It is the node at which algorithms on the tree begin, since as a data structure, one can only pass from parents to children. Below the root node may be one or more nodes known as the child's parent node or ancestor node. Below the ancestor node maybe a child node and so on.

In one embodiment, an enterprise application nexus application programming interface (API) (EANA) executed by the computer system sends status messages to the application nodes. The EANA may detect failure in the application node when the application node does not respond to the status message. The EANA may send a lock message to the failed application node and ancestors' nodes of the failed application node when the failed application node is an aware application node. In one embodiment, the ancestors' nodes are nodes that have one or more child nodes. So, for example, the failed application node maybe a child node and the ancestors' nodes have the failed application node as the child node. In one embodiment, the aware application node is an application node configured to receive the lock message and an unlock message directly from the EANA.

In one embodiment, the lock message is a set of instructions to suspend operation of the failed application node and the ancestors' nodes of the failed application node. The unlock message may be a set of instructions to resume operations of the failed application node and the ancestors' nodes of the failed application node.

The EANA may send the status message to the failed aware application node. The EANA may send the unlock message to the failed aware application node and the ancestors' nodes of the failed aware application node when the failed aware application node responds to the status message.

In one embodiment, the EANA may send a lock message to an EANA proxy when the failed application node is an unaware application node. The unaware application node may be an application node not capable of receiving the lock message and the unlock messages directly from the EANA module.

In one embodiment, the EANA proxy blocks all messages to and from the failed unaware application node and the ancestors' nodes of the failed unaware application node upon receipt of the lock message. The EANA may send the status message to the failed unaware application node. The EANA may send the unlock message to the EANA proxy when the failed unaware application node responds to the status message. In one embodiment, the EANA proxy passes all message to and from the failed unaware application node and the ancestors' nodes of the failed unaware application node upon receipt of the unlock message.

A method of one embodiment of the disclosure includes sending a status message to applications nodes in a distributed application. The method also includes detecting a failure in the application node when the application node does not respond to the status message. The method further includes routing, by enterprise application nexus application programming interface (EANA) module, a lock message to the failed application node and ancestors' nodes of the failed application node when the failed application node is an aware application node.

The aware application node is the application node capable of receiving the first lock and a first unlock message directly from the EANA module. The first lock message includes instructions to a first suspend operation of the application node and ancestors' nodes of the application node. The first unlock message includes instructions to a first resume operation of the application node and the ancestors' nodes of the application node.

A prior solution for managing failure of applications in a distributed environment includes exception handling. This solution presents several disadvantages. One of the disadvantages is that it is application specific and does not guarantee that exception may be invoked all the time. Another disadvantage is that the. since the exception is application specific, it is not guaranteed that the exception may be invoked all the time. Further disadvantage is that different applications use various timeouts, which complicates their unified usage. Embodiments of the disclosure overcome these disadvantages by utilizing a central point which is not dependent to implementation of the nodes so it can detect any failure including the failures in the hardware. Embodiments of the disclosure also overcome these disadvantages by coordinating distributed application with lock and unlock messages.

FIG. 1 is a block diagram illustrating a distributed application environment 100 in which embodiments of the present invention may be implemented. The distributed environment application system 100 includes a server device 104 connected to one or more software applications ("applications") 102 via network 120. The network 100 may be a private network (e.g., a local area network (LAN), wide area network (WAN), intranet, etc.), public network (e.g., the Internet), or a combination thereof. In one embodiment, storage devices 130a-130N are fragmented storage devices, such as iSCSI, FibreChannel, and/or any other type of network block devices, implemented as a data center.

In one embodiment, the server device 110 is a computing device with a hardware platform including one or more processing devices 108 and data storage 118. In one embodiment, the data storage 118 comprises one or more hardware or software devices. Examples of data storage 118 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform may include additional hardware devices 117, such as network interface cards (NICs), sound or video adaptors, photo/video cameras, printer devices, keyboards, displays or any other suitable device intended to be coupled to a computer system.

In one embodiment, the applications 102 may be any computer-executable program capable of communicating with the server device 104. Some of these applications may include, but are not limited to, web applications, Microsoft™ applications, an Eclipse integrated development environment (IDE), and/or other applications.

In one embodiment, the applications in a distributed environment include a tree structure of applications 102. A tree structure can be defined recursively (locally) as a collection of nodes (starting at a root node), where each node is an application 102, together with a list of nodes (the "children"), with the constraints that no node is duplicated. Each node in the tree has zero or more child nodes, which are below it in the tree (by convention, trees are drawn growing downwards). A node that has a child is called the child's parent node (or ancestor node). The topmost node in a tree is called the root node. Being the topmost node, the root node does not have a parent. It is the node at which algorithms on the tree begin, since as a data structure, one can only pass from parents to children. Below the root node may be one or more nodes known as the child's parent node or ancestor node. Below the ancestor node maybe a child node and so on.

In one embodiment, the application nodes are idle. In one embodiment, the application nodes are processing an operation in the distributed environment. Such operation may include, but is not limited, to accept messages, send messages and process messages. In one embodiment, the OS 104 receives the request from a client. The request may include the operation to be processed by the application nodes in the distributed environment. The client may be a user of the distributed application environment 100. The client may be another device communicably coupled to the distributed application environment 100. In one embodiment, the request is received at a root node of the distributed environment. The root node may distribute the request to the child nodes. The OS 104 may also include a graphical user interface (GUI) 116 configured to provide an interface to the client for submitting the request and receiving the processed request.

Figure 2:
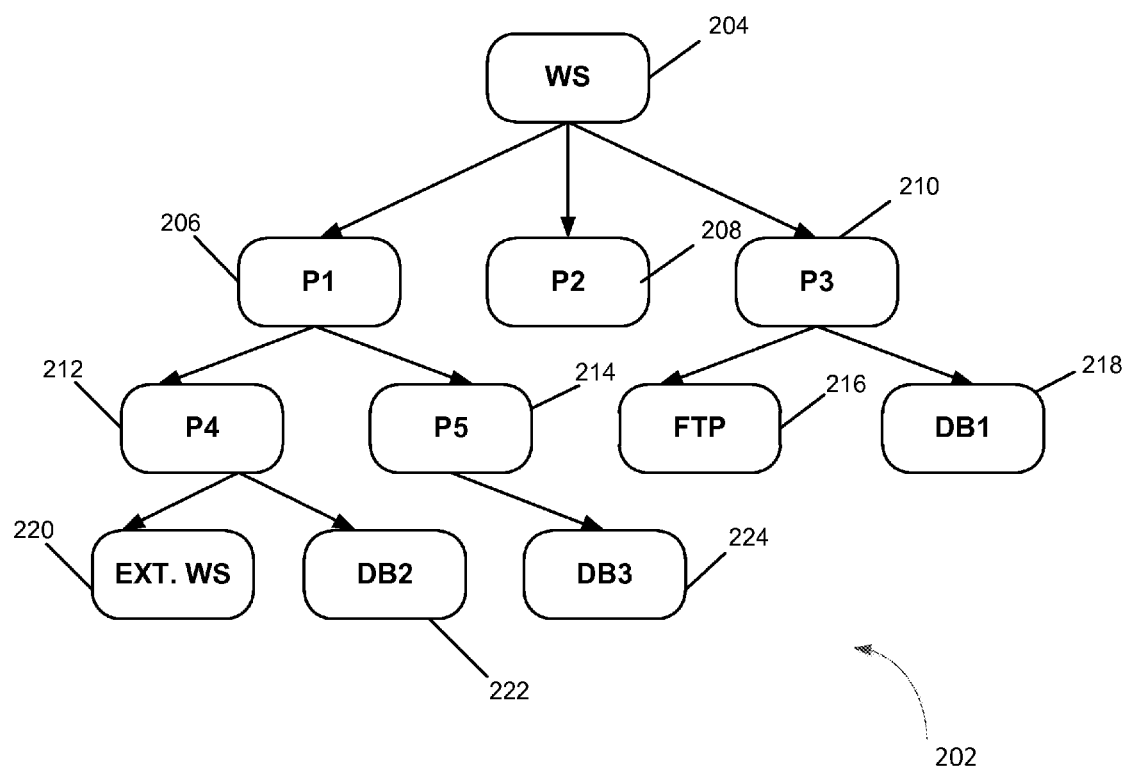
FIG. 2 illustrates an example of a tree structure of applications of a distributed environment in accordance with some embodiments.

An example of a tree structure (hereinafter "tree") of application nodes 202 is illustrated in FIG. 2. In one embodiment application nodes 202 are the same as the applications 102 depicted in FIG. 1. As shown, the root node of the tree structure 200 may include a web service (WS) 204 application having three child application nodes, P1 206, P2 208 and P3 210. The application node, P1 206 may also include two child application nodes, P4 212 and P5 214. The application node, P3 210 may also include two child application nodes, file transfer protocol (FTP) 216 and database1 (DB1) 218. The application node, P4 212 may also include two child application nodes, external web service (Ext. WS) 220 and database2 (DB2) 222. The application node, P5 214 may further include one child application node, database3 (DB3) 224.

Referring back to FIG. 1, the server device 104 also includes an EANA module 112 to manage failure of enterprise applications in the distributed application environment 100. In one embodiment, the EANA module 112 monitors the application nodes 202. For example, the EANA module 112 may send ping messages directly to application nodes 202 in order to monitor the nodes 202. A ping message may be a message requesting status of the application.

In one embodiment, the EANA module 112 may detect a failure in the application node 202. The EANA module 112 may detect failure in the application node 202 when the application node 202 does not respond to the ping message. In one embodiment, the EANA module 112 detects failure in the application node 202 when the application node 202 does not respond to at least a specific number of the ping messages. As an example, the specific number of ping messages may be one, three, five, seven, and so on. In one embodiment, the specific number of ping messages may be configured by an administrator. In one embodiment, the EANA module 112 detects failure in the application node 202 when the application node 202 does not respond to the ping message in a pre-determined time. As an example, the pre-determined time may be ten seconds, thirty seconds, one minute, one hour, and so on. In one embodiment, the pre-determined time may be configured by an administrator.

In one embodiment, the EANA module 112 may send a first lock message directly to the application node 202 and all the ancestors' nodes of the application node 202 when the failure is detected in the application node 202. In one embodiment, the ancestors' nodes are nodes that have one or more child nodes. So, for example, the application node maybe a child node and the ancestors' nodes have the application node as the child node. In one embodiment, the first lock message is a set of instructions for a first suspend operation of the application node 202 and all of the ancestors' nodes of the application node 202. As discussed above, the ancestors' nodes The first suspend operation may include, but is not limited to, instructions to store messages that are waiting for processing, discard messages in queues, stop accepting any message and stop sending any message.

The server 104 further includes an EANA proxy module 114 to manage failure of enterprise applications in distributed environment in the computer system. In one embodiment, the EANA proxy module 114 functions as an intermediary between a node and the EANA module 112. The EANA proxy module 114 may be a wrapper around the node 202 that does not have EANA module 112 such that the nodes 202 send and receive messages only through EANA proxy module 114. In one embodiment, the EANA module 112 may send a second lock message to the EANA proxy module 114 when the failure is detected in the application node 202. In one embodiment, the EANA proxy module 114 does not communicate with the application node 202. The EANA proxy module 114 may consume the second lock message from the EANA module 112. The EANA proxy module 114 may block all messages to and from the unaware application node 202b. In one embodiment, the second lock message is a set of instructions to a second suspend operation of the application node 202 and all the ancestors' nodes of the application node 202. The second suspend operation may include, but is not limited to, instructions to stop accepting any message and stop sending any message.

In one embodiment, the EANA module 112 may resend the ping message to the failed application node 202. The EANA module 112 may detect that the application node 202 is no longer a failed application node when the application node 202 responds to the ping message. In one embodiment, the EANA module 112 may send a first unlock message directly to the application node 202 and all the ancestors' nodes of the application node 202 when the application node 202 is no longer a failed application node. In one embodiment, a first unlock message is a set of instructions for a first resume operation of the application node 202 and all the ancestors' nodes of the application node 202. The first resume operation may include, but is not limited to, instructions to load all the stored messages into appropriate queue, start accepting messages and start sending messages.

In one embodiment, the EANA module 112 may send a second unlock message to the EANA proxy module 112 when the application node 202 is no longer a failed application node. In one embodiment, the EANA proxy module 114 may consume the second unlock message from the EANA module 112. The EANA proxy module 114 may pass all the messages to and from the unaware application node 202b. In one embodiment, a second unlock message is a set of instructions to a second resume operation of the application node 202 and all the ancestors' nodes of the application node 202. The second resume operation may include, but is not limited to, instructions to load all the stored messages into appropriate queue, start accepting messages and start sending messages.

In one embodiment, each application node 202 in the tree 200 is either an aware application node 202a or an unaware application node 202b. The aware application node 202a may be the application node 202 that is configured to receive the first lock and first unlock messages directly from the EANA module 112. In one embodiment, the aware application node 202a includes EANA module 112 which may process lock and unlock messages. As an example, the P1 206, P2 208, P3 210, P4 212 and P5 214 are aware application nodes 202a.

In one embodiment, the unaware application node 202b is an application node 202 that is not configured to receive the first lock message and the first unlock message from the EANA module 112. In one embodiment, the EANA proxy module 114 wraps the unaware application node 202b. In one embodiment, the EANA proxy module 114 may consume the second lock message from the EANA module 112. The EANA proxy module 114 may block all messages to and from the unaware application node 202b. In one embodiment, the EANA proxy module may consume the second unlock message from the EANA module 112. The EANA proxy module 114 may pass all the messages to and from the unaware application node 202b. As an example FTP 216, Ext. WS 220, DB1 220, DB2 222 and DB3 224 are unaware application nodes 202b.

In one embodiment, the EANA module 112 monitors both the aware application nodes 202a and the unaware application nodes 202b. In one embodiment, the EANA module 112 sends ping messages directly to both the aware application nodes 202a and the unaware applications nodes 202b. As discussed above, a ping message is a message requesting status of the application.

In one embodiment, the EANA module 112 may detect a failure in the aware application nodes 202a. The EANA module 112 may detect failure in the aware application node 202a when the aware application node 202a does not respond to the ping message.

In one embodiment, the EANA module 112 may send the first lock message to the failed aware application node 202a and all the ancestors' nodes of the failed aware application node 202a. As discussed above, a first lock message is as set of instructions to a first suspend operation of the application node 202 and all the ancestors' nodes of the application node 202. Also as discussed above, the first suspend operation may include, but is not limited to, store messages that are waiting for processing, discard messages in queues, stop accepting any message and stop sending any message.

In one embodiment, the EANA module 112 may resend the ping message to the failed aware application node 202a. The EANA module 112 may detect that the aware application node 202a is no longer a failed aware application node 202a when the aware application node 202a responds to the ping message. In one embodiment, the EANA module 112 may send the first unlock messages to the aware application node 202a and all the ancestors' nodes of the aware application node 202a. As discussed above, a first unlock message may be a set of instructions to a first resume operations of the application node 202 and all the ancestors' nodes of the application node 202. The first resume operation may include, but is not limited to, instructions to load all the stored messages into appropriate queue, start accepting messages and start sending messages.

In one embodiment, the EANA module 112 may detect failure in the unaware application node 202b. The EANA module 112 may detect failure in the unaware application node 202b when the unaware application node 202b does not respond to the ping message.

In one embodiment, the EANA module 112 may send the second lock message to the EANA proxy module 114 when the failure is detected in the unaware application node 202b. In one embodiment, the EANA proxy module 114 blocks all the messages sent to and received by the failed unaware application node 202b and all the ancestors' nodes of the aware application node 202b. As discussed above, a second lock message is a set of instructions to a second suspend operation of the application 202 and all the ancestors' nodes of the application node 202. Also, as discussed above, the second suspend operation may include, but is not limited to, instructions to stop accepting any message and stop sending any message In one embodiment, the EANA module 112 may resend the ping message to the failed unaware application node 202b. The EANA module 112 may detect that the failed unaware application node 202b is no longer a failed unaware application node 202a when the unaware application node 202b responds to the ping message. In one embodiment, the EANA module 112 may send the second unlock message to the EANA proxy module 114. In one embodiment, the EANA proxy module 114 passes all the messages send to and received by the failed unaware application node 202b and all the ancestors' nodes of the aware application node 202b. As discussed above, a second unlock message may be a set of instructions to a second resume operations of the application node 202 and all the ancestors' nodes of the application node 202. Also, as discussed above, the second resume operation may include, but is not limited to start accepting messages and start sending messages.

Figure 3A:
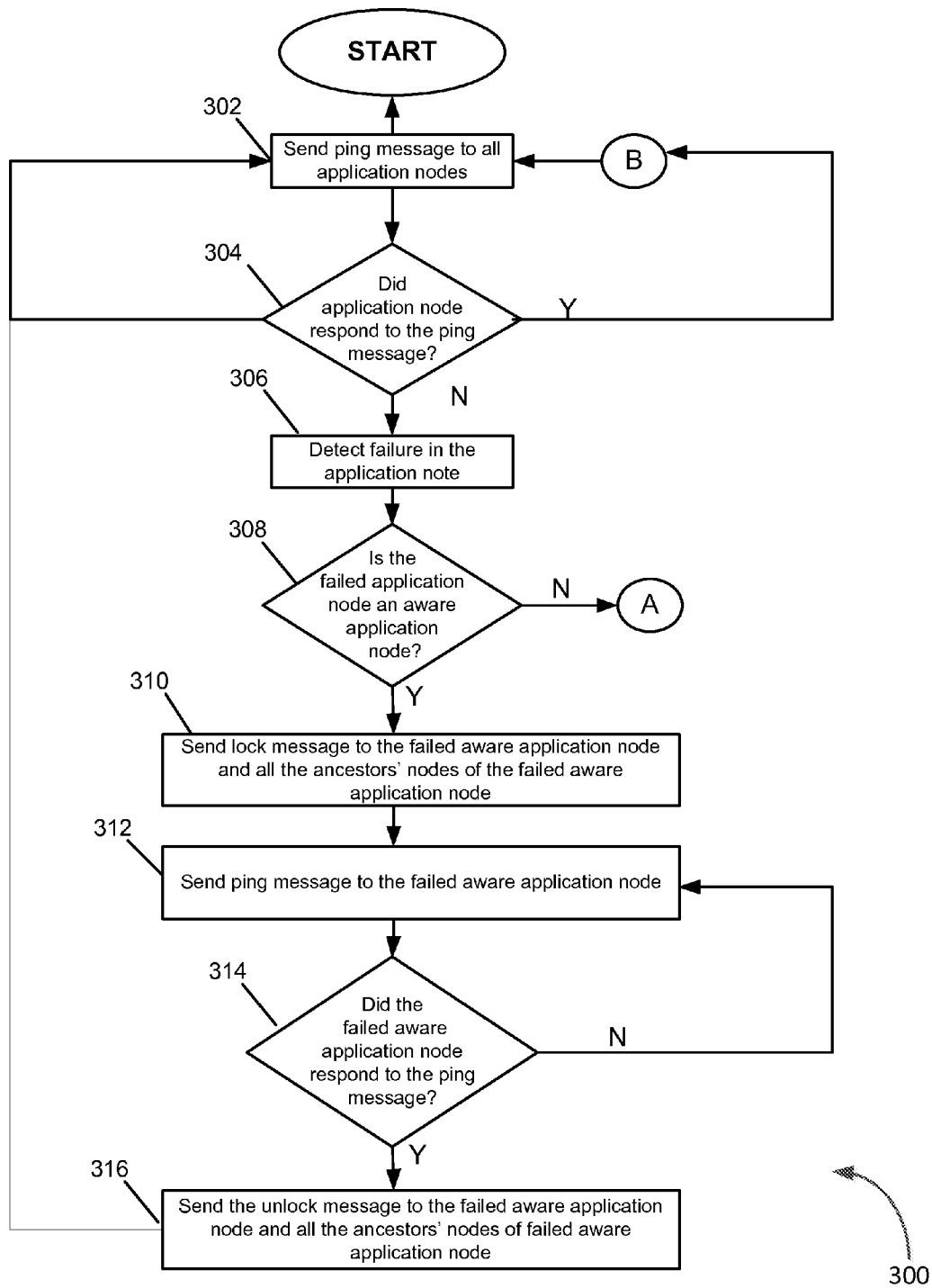
FIGS. 3A and 3B are flow diagrams of one embodiment of a method for managing failure of applications.
Figure 3B:
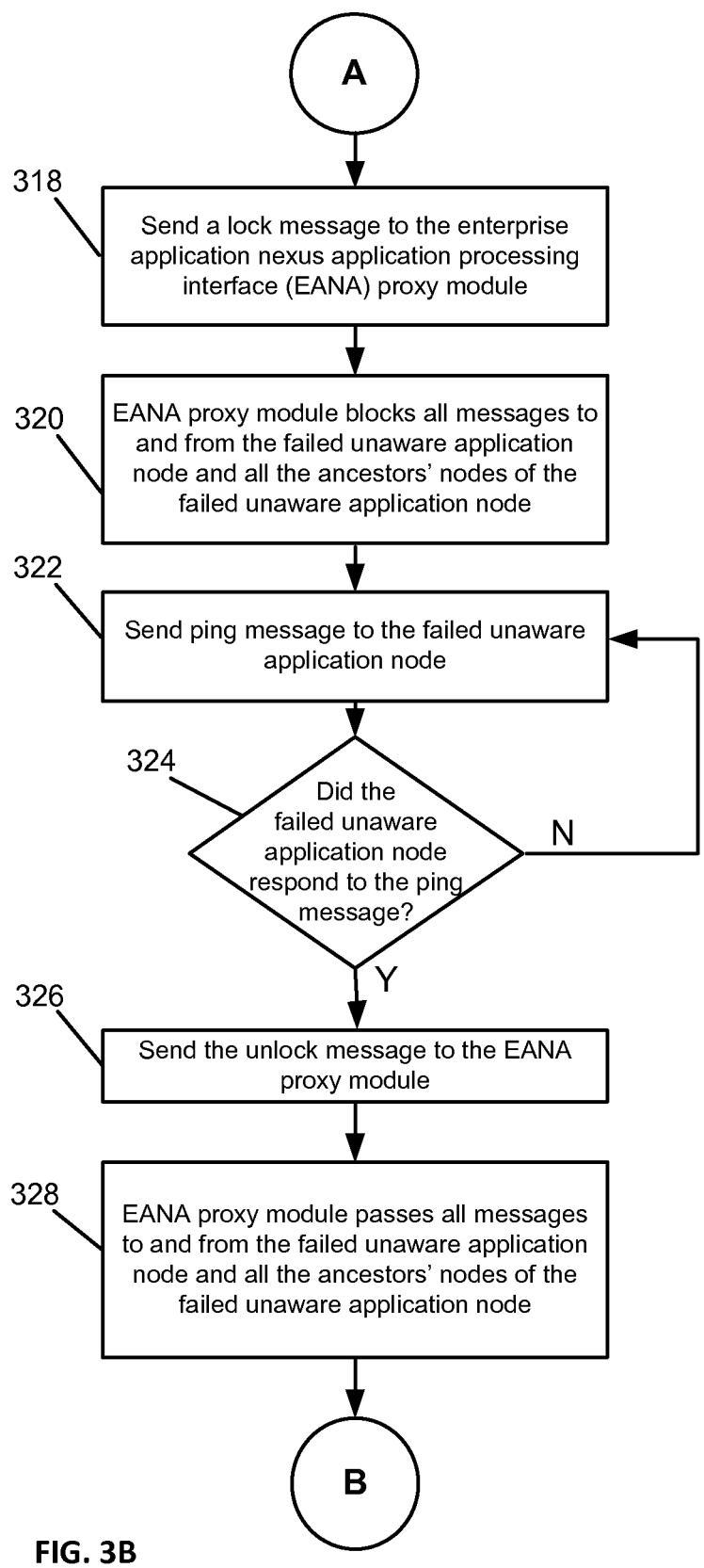

FIGS. 3A and 3B are flow diagrams illustrating a method 300 for managing failure of applications in a distributed environment according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by EANA module 112 and EANA proxy module 114 of FIG. 1 executing in the distributed application environment 100 of FIG. 1.

Method 300 begins at block 302 where the EANA module 112 sends a ping message to all the application nodes 202 as illustrated for example in FIG. 2. As discussed above, a ping message is a message requesting status of the application. In one embodiment, the application nodes are idle. In one embodiment, the application nodes are processing an operation in the distributed environment. Such operation may include, but is not limited, to accept messages, send messages and process messages.

At block 304, the EANA module 112 determines whether the application node 202 responds to the ping message. The EANA module 112 repeats block 302 when at block 304 it is determined that the application node 202 responded to the ping message. At block 306, the EANA module 112 detects a failure in the application node 202 when at block 304 it is determined that the application node 202 did not respond to the ping message. As discussed above, the EANA module 112 may detect failure in the application node 202 when the application node 202 does not respond to at least a specific number of the ping messages. Also as discussed above, the EANA module 112 may detect failure in the application node 202 when the application node 202 does not respond to the ping message in a pre-determined time.

At block 308, the EANA module 112 determines whether the failed application node 202 is an aware application node 202a. As discussed above, the aware application node may be part of the distributed enterprise application that receives the first lock message and the first unlock message directly from the EANA module 112. As discussed above, the first lock message is a set of instructions to a first suspend operation of the application node 202 and all the ancestors' nodes of the application node 202. Also, as discussed above, the first unlock message may be a set of instructions to a first resume operations of the application node 202 and all the ancestors' nodes of the application node 202.

At block 310, the EANA module 112 sends the first lock message directly to the failed application aware node 202a and all the ancestors' nodes of the failed aware application node 202a when it is determined at block 308 that the failed application node 202 is an aware application node. As an example, the failed application aware node 202a is P4 212 as illustrated in FIG. 2. As such, the first lock message is received by P4 212 and the ancestors' nodes of the P4 212, which are P1 206 and WS 204 as illustrated in FIG. 2. As discussed above, the first lock message is a set of instructions to a first suspend operation of the application 202 and all the ancestors' nodes of the application node 202. The first suspend operation may include, but is not limited to, store messages that are waiting for processing, discard messages in queues, stop accepting any message and stop sending any message.

At block 312, the EANA module 112 sends the ping message to the failed aware application node 202a. At block 314, the EANA module 112 determines whether the failed aware application node 202a responds to the ping message. The EANA module 112 repeats block 312 when the failed aware application node 202a does not respond to the ping message.

At block 316, the EANA module 112 sends the first unlock message directly to the failed aware application node 202 and all the ancestors' nodes of the application node 202 when the failed aware application 202a responds to the ping message. As an example, the first unlock message will be received by the P4 212 and its ancestors' nodes P1 206 and WS 204 as illustrated in FIG. 2. In one embodiment, the first unlock message is a set of instructions to a first resume operations of the application node 202 and all the ancestors' nodes of the application node 202. The first resume operation may include, but is not limited to, instructions to load all the stored messages into appropriate queue, start accepting messages and start sending messages. Subsequently, the EANA module 112 repeats block 302.

At block 318, the EANA module 112 sends a lock message to the EANA proxy module 114 when it is determined at block 308 that the failed application node 202 is not an aware application node. In one embodiment, the failed application node 202 is an unaware application node 202b. As discussed above, the unaware application node is part of the distributed enterprise application that does not receive the lock and unlock message directly from the EANA module 112.

At block 320, the EANA proxy module 114 blocks all messages to and from the failed unaware application node 202b and all the ancestors' nodes of the failed unaware application node 202b. As such, the failed unaware application node 202b and all its ancestors' nodes fail to receive and send messages. As an example, the failed unaware application node 202b DB2 222 and the ancestors' nodes of the DB222, which are P4 212, P1 206 and WS 202 as illustrated in FIG. 2 fail to receive and send messages. As discussed above, the first lock message is a set of instructions to a first suspend operation of the application 202 and all the ancestors' nodes of the application node 202. The first suspend operation may include, but is not limited to, instructions to stop accepting any message and stop sending any message.

At block 322, the EANA module 112 sends the ping message to the failed unaware application node 202b. At block 324, the EANA module 112 determines whether the failed unaware application node 202b responds to the ping message. The EANA module 112 repeats block 322 when the failed unaware application node 202 does not respond to the ping message.

At block 326, the EANA module 112 sends the second unlock message to the EANA proxy module 114 when the failed unaware application node 202b responds to the ping message. At block 328, the EANA proxy module 114 passes all messages to and from to the failed unaware application node 202b and all the ancestors' nodes of the failed unaware application node 202b. As such, the failed unaware application node 202b and all its ancestors' nodes begin to receive and send messages. As an example, the failed unaware application node 202b DB2 222 and the ancestors' nodes of the DB222, which are P4 212, P1 206 and WS 202 as illustrated in FIG. 2 begin to receive and send messages. In one embodiment, the second unlock message is a set of instructions to a second resume operations of the application node 202 and all the ancestors' nodes of the application node 202. The second resume operation may include, but is not limited to start accepting messages and start sending messages. The EANA module 112 repeats block 302.

Figure 4:
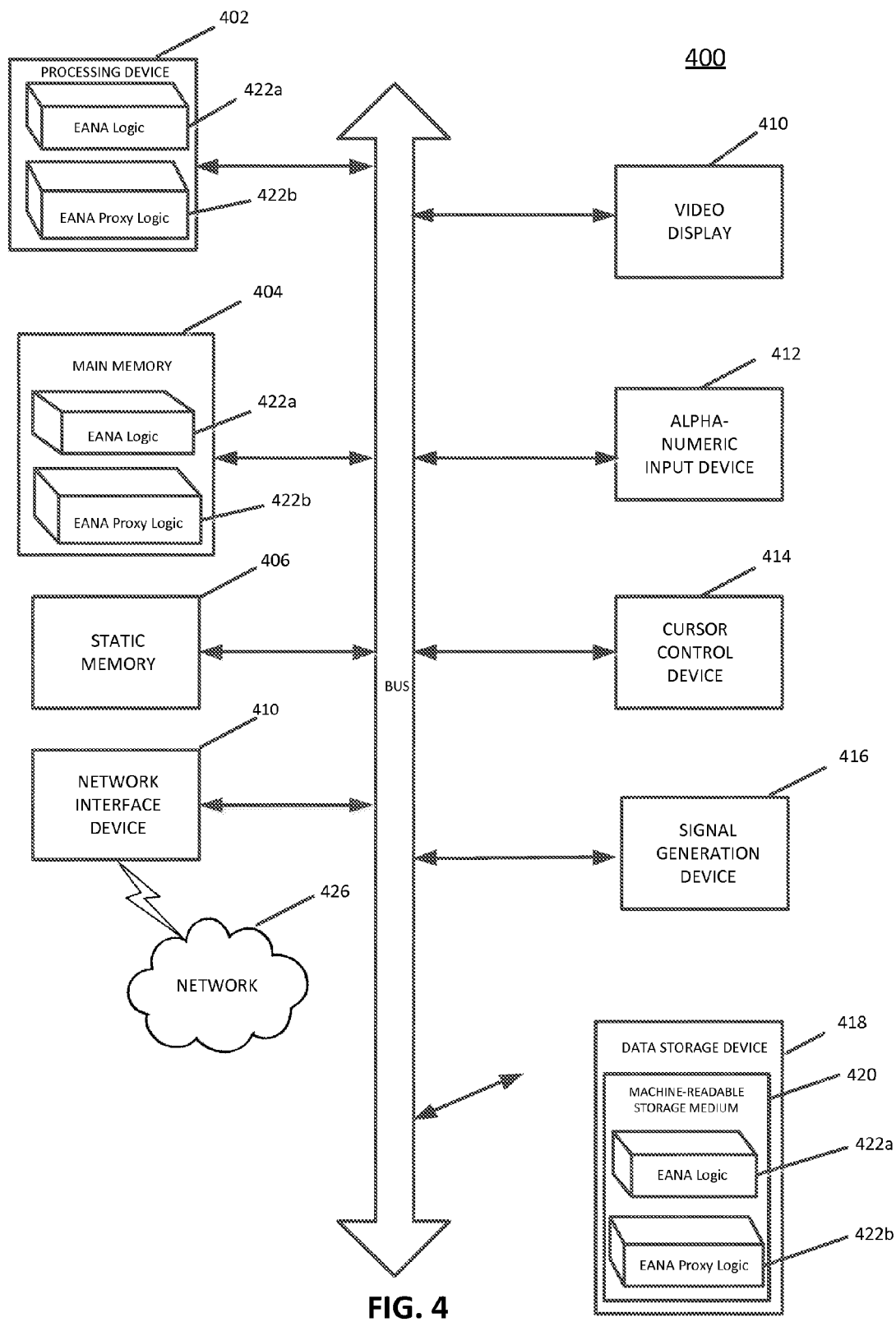
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute enterprise application nexus application processing interface (EANA) logic 422a and EANA proxy logic 422b for performing the operations and steps discussed herein. In one embodiment, EANA module 112 and EANA proxy module 114 are described with respect to FIG. 1 performs the EANA and EANA proxy logic 422a and 422b respectively.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. EANA and EANA proxy logic 422) embodying any one or more of the methodologies of functions described herein, such as method 300 for preventing overload of application described with respect to FIGS. 3A and 3B. The EANA and EANA proxy logic 422a and 422b respectively, may also reside, completely or at least partially, within the memory 406 and/or within the processing device 402 during execution thereof by the computer system 400; the memory 406 and the processing device 402 also constituting machine-accessible storage media.

The machine-readable storage medium 420 may also be used to store the EANA and EANA proxy processing logic 422a and 422b respectively, persistently containing methods that call the above applications. While the machine-readable storage medium 420 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", 'sending", "routing", "transmitting", "providing", "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
sending a status message to a plurality of application nodes of a distributed application, wherein the status message comprises a request for status of each of the plurality of application nodes;
detecting a failure in an application node of the plurality of application nodes when the application node does not respond to the status message; and
routing, by a processing device, a first lock message to the failed application node and ancestors' nodes of the failed application node when the failed application node is an aware application node, wherein the first lock message comprises instructions to execute a first suspend operation of the failed aware application node and ancestors' nodes of the failed aware application node.

2. The method of claim 1 wherein the failed aware application node is capable of receiving the first lock message and a first unlock message directly from an enterprise application nexus application processing interface (EANA) module executed by the processing device, the first unlock message comprising instructions to execute a first resume operation of the failed aware application node and the ancestors' nodes of the failed aware application node.

3. The method of claim 2 further comprising sending the status message to the failed aware application node and transmitting the first unlock message to the failed aware application node and the ancestors' nodes of the failed aware application node when the failed aware application node responds to the status message.

4. The method of claim 2 further comprising sending, by the EANA module executed by the processing device, a second lock message to an EANA proxy module executed by the processing device when the failed application node is an unaware application node, wherein the failed unaware application node is when the failed application node is not capable of receiving the first lock message and the first unlock message directly from the EANA module, the second lock message comprising instructions to execute a second suspend operation of the failed unaware application node and ancestors' nodes of the failed unaware application node.

5. The method of claim 4 wherein the EANA proxy module blocks messages to and from the failed unaware application node and the ancestors' nodes of the failed unaware application node.

6. The method of claim 5 further comprising sending the status message to the failed unaware application node and transmitting a second unlock message to the EANA proxy module when the failed unaware application node responds to the status message, the second unlock message comprising instructions to execute a second resume operation of the failed unaware application node and the ancestors' nodes of the failed unaware application node.

7. The method of claim 6, wherein the EANA proxy module passes messages to and from the failed unaware application node and the ancestors' nodes of the failed unaware application node.

8. A system comprising:
a memory; and
a processing device operatively coupled to the memory to:
send a status message to a plurality of application nodes in a distributed application, wherein the status message comprises a request for status of each of the plurality of application nodes;
detect a failure in an application node of the plurality of application nodes when the application node does not respond to the status message; and
route a first lock message to the failed application node and ancestors' nodes of the failed application node when the failed application node is an aware application node, wherein the first lock message comprises instructions to execute a first suspend operation of the failed aware application node and ancestors' nodes of the failed aware application node.

9. The system of claim 8 wherein the failed aware application node is capable of receiving the first lock message and a first unlock message directly from an enterprise application nexus application processing interface (EANA) module executed by the processing device, the first unlock message comprising instructions to execute a first resume operation of the failed aware application node and the ancestors' nodes of the failed aware application node.

10. The system of claim 9, wherein the EANA module sends the status message to the failed aware application node and transmits the first unlock message to the failed aware application node and the ancestors' nodes of the failed aware application when the failed aware application node responds to the status message.

11. The system of claim 9, wherein the EANA module sends a second lock message to an EANA proxy module executed by the processing device, when the failed application node is an unaware application node, wherein the failed unaware application node is when the failed application node is not capable of receiving the first lock message and the first unlock message directly from the EANA module, the second lock message comprising instructions to execute a second suspend operation of the failed unaware application node and ancestors' nodes of the failed unaware application node.

12. The system of claim 11 wherein the EANA proxy module blocks messages to and from the failed unaware application node and the ancestors' nodes of the failed unaware application node.

13. The system of claim 12, wherein the EANA module sends the status message to the failed unaware application node and transmits a second unlock message to the EANA proxy module when the failed unaware application node responds to the status message, the second unlock message comprising instructions to execute a second resume operation of the failed unaware application node and the ancestors' nodes of the failed unaware application node.

14. The system of claim 13, wherein the EANA proxy module passes messages to and from the failed unaware application node and the ancestors' nodes of the failed unaware application node.

15. A non-transitory machine-readable storage medium including data that, when accessed by a processing device, cause the processing device to:
    send a status message to a plurality of application nodes in a distributed application, wherein the status message comprises a request for status of each of the plurality of application nodes;
    detect a failure in an application node of the plurality of application nodes when the application node does not respond to the status message; and
    route, by the processing device, a first lock message to the failed application node and ancestors' nodes of the failed application node when the failed application node is an aware application node, wherein the first lock message comprises instructions to execute a first suspend operation of the failed aware application node and ancestors' nodes of the failed aware application node.

16. The non-transitory machine-readable storage medium of claim 15 wherein the failed aware application node is capable of receiving the first lock message and a first unlock message directly from an enterprise application nexus application processing interface (EANA) module executed by the processing device, the first unlock message comprising instructions to execute a first resume operation of the failed aware application node and the ancestors' nodes of the failed aware application node.

17. The non-transitory machine-readable storage medium of claim 16 wherein the EANA module sends a second lock message to an EANA proxy module executed by the processing device, when the failed application node is an unaware application node, wherein the failed unaware application node is when the failed application node is not capable of receiving the first lock message and the first unlock message directly from the EANA module, the second lock message comprising instructions to execute a second suspend operation of the failed unaware application node and ancestors' nodes of the failed unaware application node.

18. The non-transitory machine-readable storage medium of claim 17 wherein the EANA proxy module blocks messages to and from the failed unaware application node and the ancestors' nodes of the failed unaware application node.

19. The non-transitory machine-readable storage medium of claim 17, wherein the EANA module sends the status message to the failed unaware application node and transmits a second unlock message to the EANA proxy module when the failed unaware application node responds to the status message, the second unlock message comprising instructions to execute a second resume operation of the failed unaware application node and the ancestors' nodes of the failed unaware application node.

20. The non-transitory machine-readable storage medium of claim 19, wherein the EANA proxy module passes messages to and from the failed unaware application node and the ancestors' nodes of the failed unaware application node.

* * * * *